(12) United States Patent
Brown et al.

(10) Patent No.: US 8,168,026 B1
(45) Date of Patent: May 1, 2012

(54) ELASTOMERIC BALL AND METHOD OF MANUFACTURING SAME

(75) Inventors: Robert L. Brown, North Kingstown, RI (US); So Ho Fai, Kowloon (CN); Lee Yiu Wah, ApLeiChau (CN); Kenneth Lau, Tai Wai (CN)

(73) Assignee: Hasbro, Inc., Pawtucket, RI (US)

( * ) Notice: Subject to any disclaimer, the term of this patent is extended or adjusted under 35 U.S.C. 154(b) by 1129 days.

(21) Appl. No.: 11/957,106

(22) Filed: Dec. 14, 2007

Related U.S. Application Data (62) Division of application No. 11/197,020, filed on Aug. 4, 2005, now abandoned.

(51) Int. Cl.
*A63B 37/06* (2006.01)
*B29C 67/20* (2006.01)

(52) U.S. Cl. ........ 156/245; 264/46.6; 156/145; 156/242

(58) Field of Classification Search ............... 156/245
See application file for complete search history.

(56) References Cited

U.S. PATENT DOCUMENTS

| | | | |
|---|---|---|---|
| RE27,106 E | 3/1971 | Henderson | 273/65 |
| 3,932,107 A * | 1/1976 | Proudfit | 425/509 |
| 4,154,789 A | 5/1979 | Delacoste | 264/438 |
| 4,462,589 A | 7/1984 | Morgan | 273/60 R |
| 4,463,951 A | 8/1984 | Kumasaka et al. | 273/58 A |
| 4,660,830 A | 4/1987 | Tomar | 273/60 B |
| 4,729,566 A | 3/1988 | Molitor | 273/60 A |
| 5,228,687 A | 7/1993 | Luecke et al. | 273/65 EC |
| 5,253,865 A | 10/1993 | Kinnee | 273/60 A |
| 5,427,372 A | 6/1995 | Ratner et al. | 273/65 ED |
| 5,451,046 A | 9/1995 | Batton | 273/55 C |
| 5,494,625 A | 2/1996 | Hu | 264/51 |
| 5,570,882 A | 11/1996 | Horkan | 273/65 EG |
| 5,647,590 A | 7/1997 | Walker et al. | 473/601 |
| 5,833,897 A * | 11/1998 | Grimm | 264/46.5 |
| 5,941,785 A | 8/1999 | Bartels | 473/597 |
| 5,984,812 A | 11/1999 | Sassak | 473/596 |
| 6,015,358 A | 1/2000 | Spector | 473/595 |
| 6,056,842 A | 5/2000 | Dalton et al. | 156/243 |
| 6,207,095 B1 * | 3/2001 | Gosetti | 264/250 |
| 6,458,052 B1 | 10/2002 | Pitsenberger et al. | 473/598 |
| 6,514,164 B1 | 2/2003 | Parrett | 473/603 |
| 6,685,584 B2 | 2/2004 | Jin et al. | 473/596 |
| 6,719,653 B1 | 4/2004 | Nesbitt | 473/600 |
| 6,722,889 B1 | 4/2004 | Page et al. | 434/251 |
| 6,802,785 B2 | 10/2004 | Jordan et al. | 473/378 |
| 7,029,407 B2 | 4/2006 | Lee et al. | 473/597 |
| 2003/0203780 A1 | 10/2003 | Guenther et al. | 473/604 |
| 2004/0048689 A1 * | 3/2004 | Nesbitt | 473/367 |

* cited by examiner

*Primary Examiner* — Philip Tucker
*Assistant Examiner* — Vicki Wu
(74) *Attorney, Agent, or Firm* — Miller, Matthias & Hull LLP (57) ABSTRACT

The present invention is directed to a ball including an outer shell formed from a first thermoplastic material and having an inner surface defining a cavity, outer details formed from a second thermoplastic material and disposed on at least a portion of the outer surface of the outer shell, and a core formed from a foamable polymeric material and disposed within the cavity of the outer shell. The ball may be produced by forming a pair of half shells having inner surfaces defining corresponding portions of the cavity of the outer shell, forming the outer details on the outer surface of at least one of the half shells, and foaming a polymeric material to form the core.

14 Claims, 7 Drawing Sheets

ELASTOMERIC BALL AND METHOD OF MANUFACTURING SAME

CROSS REFERENCE TO RELATED APPLICATION

The present application is a divisional application of U.S. patent application Ser. No. 11/197,020, filed on Aug. 4, 2005, now abandoned, the specification of which is expressly incorporated by reference herein.

BACKGROUND

The patent is directed to a ball, and more particularly to a ball and a method of manufacturing a ball having polyurethane (PU) core, a polyvinyl chloride (PVC) shell, and PVC detailing covering at least a portion of the outer surface of the PVC shell.

Various balls fabricated from multiple layers of material and manufactured by molding processes have been previously described. For example, U.S. Pat. No. 3,932,107 to Proudfit discloses an apparatus for forming a composite article including an inflatable center adapted to retain a predetermined shape covered with a covering of molded material and preferably an inflatable composite article such as a game ball with a covering of more uniform thickness. Surfaces of complementary elements of a mold are adapted to define, when the mold is closed, a molding cavity corresponding to the outer surface of a desired composite article. The surfaces are electrostatically sprayed with a molding material to form a layer of molding material over the surfaces. An inflatable center is then inserted into the mold and the mold is closed to define the molding cavity with the inflatable center therein. Thereafter, the inflatable center is inflated to compress the molding material against the surfaces of the molding cavity to produce mold details. The mold is then heated to fuse the molding material to the desired covering for the inflatable composite article. Subsequently, the mold is cooled and the composite article is removed from the mold.

U.S. Pat. No. 4,462,589 to Morgan discloses a durable, composite safety ball formed with a soft, resilient, substantially closed-cell plastic foam core. The safety ball, including the cover, has a type A durometer less than about 60 and preferably in the range of about 25 to about 45. Preferably the core is surrounded by an inner skin which is formed to substantially prevent the entry of water into the foam of the core and, together with an outer heavy, tightly knit nylon cover, to provide sufficient strength to hold the soft cellular plastic foam together as a unit. The soft foam core is preferably a urethane foam and enables the formation of balls which have a performance similar to regulation baseballs and softballs and yet will not produce a substantial risk of injury to players or risk of property damage. The composite safety ball is also sting-free and has a long useful life.

U.S. Pat. No. 4,463,951 to Kumasaka et al. discloses a ball for a game having a spherical soft polyurethane foam and a surface layer of foamed polyvinyl chloride formed on the surface of the spherical body. The ball is produced by first casting the surface layer in a mold to form a hollow foamed PVC body having closed cells, and then charging a foamed polyurethane composition into the hollow thus formed, to produce a sphere of polyurethane having open cells within the surface layer. Also provided is a ball for games having a spherical body of foamed polyvinyl chloride and having a spherical cavity at the center. The ball is safe, has proper flexibility, and is not subject to punctures.

U.S. Pat. No. 5,427,372 to Ratner et al. discloses a play ball having visually distinctive colored patches distributed over its exterior. Portions of the ball exterior may be uncovered with patches, and have a color distinct from the color of the patches. Regions of different tactile patterns are impressed on the ball, and these regions may match all or parts of differently colored patches. Ratner et al. also discloses a method of making a game ball with patches on its exterior.

U.S. Pat. No. 5,984,812 to Sassak discloses a mesh panel for throwable and/or grippable objects such as footballs, baseballs, basketballs, baseball bats, etc. The mesh panel is formed from polyvinyl chloride and includes a plurality of openings surrounded by a plurality of connecting portions. The outer surface of the mesh panel is such that each of the connecting portions includes a plurality of rib portions which further enhance the ability to grip the mesh panel. The inside surface of the mesh panel has an adhesive coating which bonds to an outer surface of the object to which the mesh panel is attached when heat is applied to the mesh panel. The heating of the mesh panel also causes a sticky, resin-like outer surface to be formed. The mesh panel enables various objects such as footballs, baseballs, basketballs, baseball bats, etc. to be much more easily grasped, thrown and caught by individuals of all ages and sizes, and particularly by individuals such as small adults and children having relatively small hands. The mesh panel is durable, does not add appreciable weight to the object to which it is attached or otherwise significantly affect the aerodynamics or trajectory of throwable objects to which the mesh panel is attached.

U.S. Pat. No. 6,685,584 to Jin et al. discloses a game ball having improved gripability. The game ball includes a bladder and a cover. The cover is positioned over the bladder. The cover has an inner surface and an outer surface. The cover has a first impression pattern formed into, and covering at least a portion of, the outer surface. The first impression pattern forms a plurality of outwardly extending raised surfaces on the outer surface. The cover further has a second impression pattern formed into the raised surfaces of the outer surface. The second impression pattern is configured to improve the gripability of the game ball.

SUMMARY OF THE INVENTION

In one aspect, the invention is directed to a ball having an outer shell formed from a first thermoplastic material and having an inner surface defining a cavity, outer details formed from a second thermoplastic material and disposed on at least a portion of the outer surface of the outer shell, and a core formed from a foamed polymeric material and disposed within the cavity of the outer shell.

In another aspect, the present invention is directed to a method of manufacturing a ball that may include forming a pair of half shells of an outer shell by molding a first thermoplastic material, wherein the inner surfaces of the half shells define corresponding portions of a cavity within the outer shell, and forming outer details on at least a portion of the outer surface of at least one of the half shells by molding a second thermoplastic material onto the outer surface of the at least one of the outer shells. The method may also include foaming a polymeric material within the cavity of the outer shell to form a core of foamed polymeric material within the cavity of the outer shell.

In a further aspect, the invention is directed to a ball including an outer shell formed from a first thermoplastic material and having an inner surface defining a cavity, outer details formed from a second thermoplastic material and disposed on at least a portion of the outer surface of the outer shell, and a core formed from a foamable polymeric material and disposed within the cavity of the outer shell. The ball may be produced by forming a pair of half shells having inner surfaces defining corresponding portions of the cavity of the outer shell, forming the outer details on the outer surface of at least one of the half shells, and foaming a quantity of the polymeric material in the cavity to form the core.

In a still further aspect, the invention is directed to an apparatus for foaming a ball that may have an outer shell comprising a pair of half shells formed from a first thermoplastic material, outer details formed from a second thermoplastic material and molded onto at least a portion of the outer surface of the outer shell, and a core formed from a foamable polymeric material and disposed within a cavity defined by an inner surface of the outer shell. The apparatus may include a first injection mold having a molding cavity corresponding to the shape of a half shell of the outer shell, and a second injection mold having a molding cavity configured to receive a half shell and engage the inner surface of the half shell. The molding cavity of the second injection mold may further be configured to engage the portions of the outer surface of the half shell that will not have outer details molded thereon, and to form at least one detail molding cavity corresponding to the shape of an outer detail and defined by a portion of the outer surface of the half shell on which the outer detail will be molded and a corresponding surface of the second injection mold. The apparatus may further include a foam mold having a molding cavity corresponding to the shape of the ball and configured to receive two half shells having outer details molded thereon.

Additional aspects of the invention are defined by the claims of this patent.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
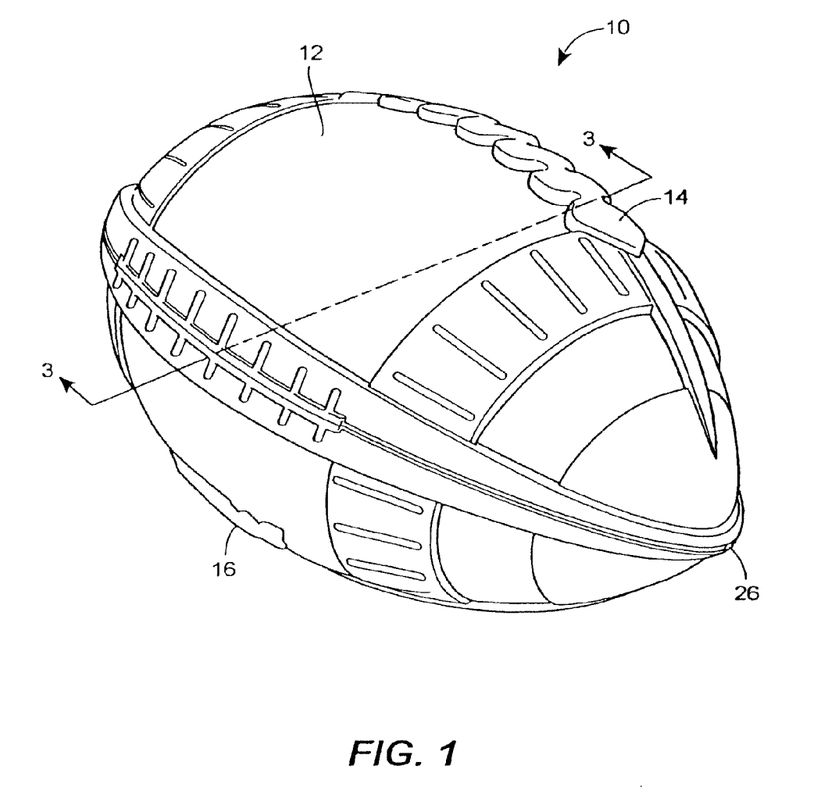
FIG. 1 is a perspective view of an embodiment of a ball in accordance with the invention.

Referring to FIG. 1, a ball 10 in accordance with the present invention may include an outer shell 12 formed from a first thermoplastic material, and details 14, 16 formed from a second thermoplastic material overmolded onto at least a portion of the outer surface of the shell 12. In the illustrated embodiment, the ball 10 is shaped to resemble a football, with the overmolded details 14 simulating the seams, laces and lines of a football and providing enhanced gripping surfaces for the user. The overmolded detailed 16 may provide additional details on the outer surface of the shell 12, such as lettering, logos and the like, and may also provide additional gripping surfaces for the user.

Figure 2:
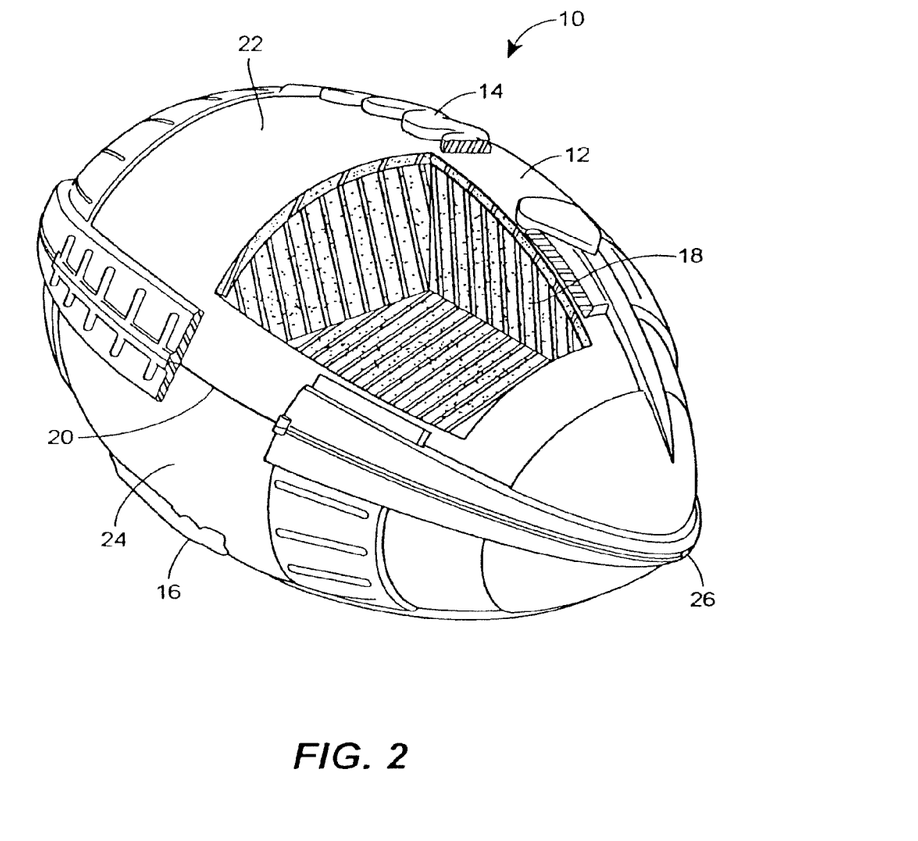
FIG. 2 is a partially cutaway view of the ball of FIG. 1.
Figure 3:
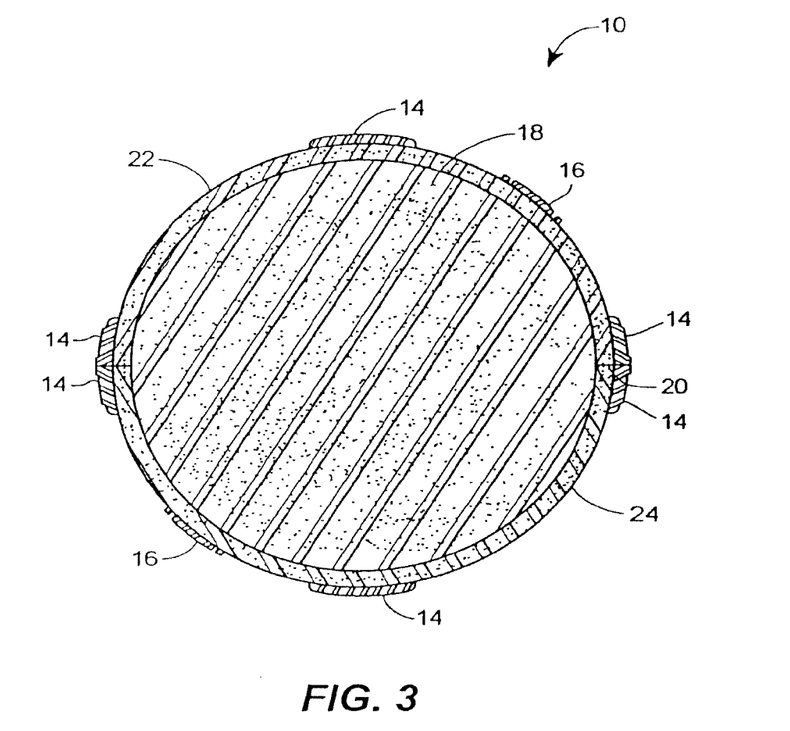
FIG. 3 is a cross-sectional view of the ball of FIG. 1 taken along line 3-3.

Turning to FIG. 2, portions of the shell 12 and details 14, 16 are cut away to reveal an inner core 18 that may be fabricated from a foamed polymeric material, such as a polyurethane foam, and that may fill the cavity defined by the inner surface of the shell 12. The core 18 may fill the entire cavity within the shell 12 and engage the inner surface of the shell 12 as shown in FIG. 3. As further described below, half shells 22, 24 of the shell 12 may be formed separately and, later in the process, adhered or otherwise connected together to form the shell 12 when the inner core 18 is formed therein. As a result, a seam 20 may exist at the interface between the half shells 22, 24. In addition, the shell 12 and, if necessary, the details 14 may have a venting hole 26 formed therethrough (FIGS. 1 and 2). The venting hole 26 may be configured to vent gas from the interior of the shell 12 when the core 18 is formed by foaming the polymeric material, and may be located in an appropriate position on the ball 10, such as at one tip of the football, to vent the gas as discussed in the process described below.

The shell 12, details 14, 16, and the core 18 may be molded during the process described below, and may be fabricated from any thermoplastic and foamed polymeric materials necessary to yield the desired performance characteristics for the ball 10. For example, in a football such as the football 10 in the illustrated embodiment, it may be desired that the final product have a hardness in the range of 55 to 72 degrees on a shore 00 durometer scale as measured at the portions of the outer surface of the shell 12 that are not covered by the outer details 14, 16, and a hardness in the range of 67 to 82 degrees on a shore 00 durometer scale as measured at the outer details 14, 16. In one embodiment, these hardness ranges for the football 10 may be achieved where the first thermoplastic material forming the shell 12 may be a PVC compound having a hardness of approximately 50 degrees on a shore A durometer scale, the second thermoplastic material forming the outer details 14, 16 may be a PVC compound having a hardness of approximately 20 degrees on a shore A durometer scale, and the foamed polymeric material forming the core 18 may be a high resilience polyurethane foam composed of polyal (approximately 53%), isocyanate (approximately 37%), blowing agent (approximately 7%) and other additives and fungi preventol (approximately 3%). Further, while the first and second thermoplastic materials may be similar compounds, at least in their hardness properties, the materials may have different colors to achieve a desired appearance for the ball 10. Those skilled in the art will understand that the ball 10 may be fabricated from other combinations of materials to produce a ball 10 having the desired performance characteristics, and they will be able to select such materials and utilize the methods described herein to manufacture the ball 10 having the desired performance characteristics. Moreover, while the illustrated embodiment shows the shell 12 being formed by two half shells 22, 24 that are symmetrical with respect to each other, and which each form half of the shell 12, the half shells 22, 24 may be asymmetrical if desired, and each form different proportions of the shell 12 and still combine to form the shape of the ball 10. Still further, depending on the implementation, the shell 12 may be formed from three or more shell portions if desired.

Figure 4:
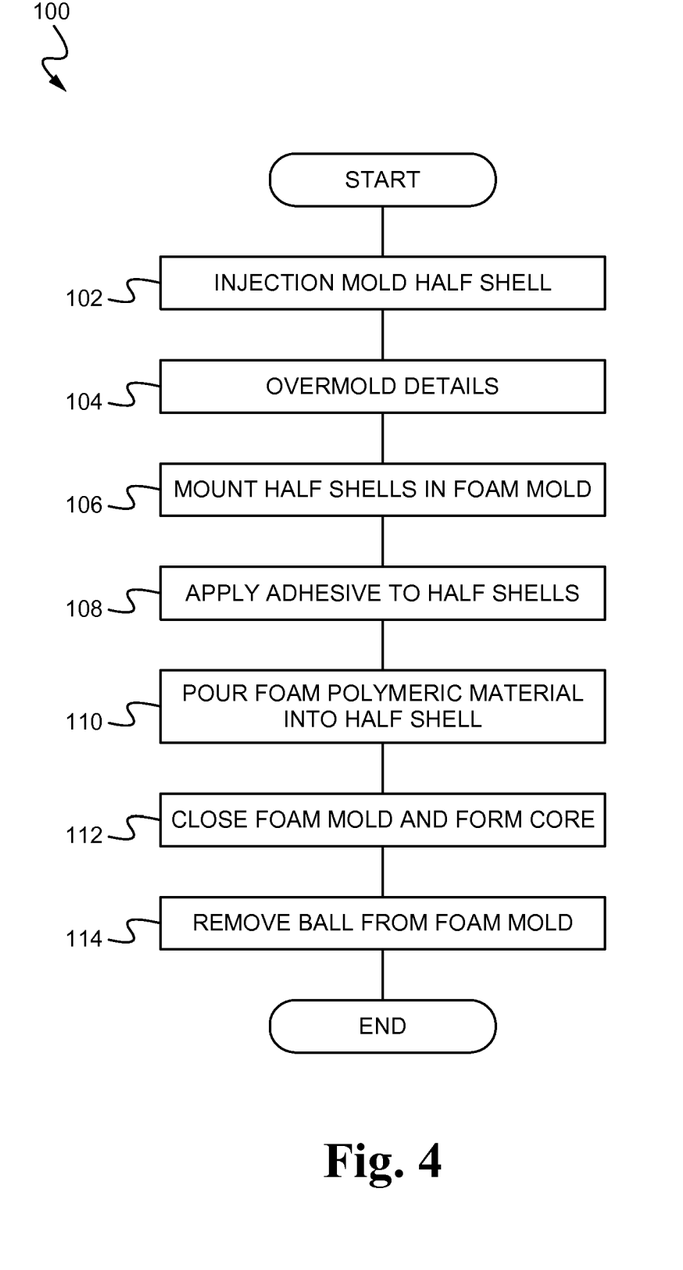
FIG. 4 is a flow chart of a process for fabricating the ball of FIG. 1 in accordance with the invention.
Figure 5:
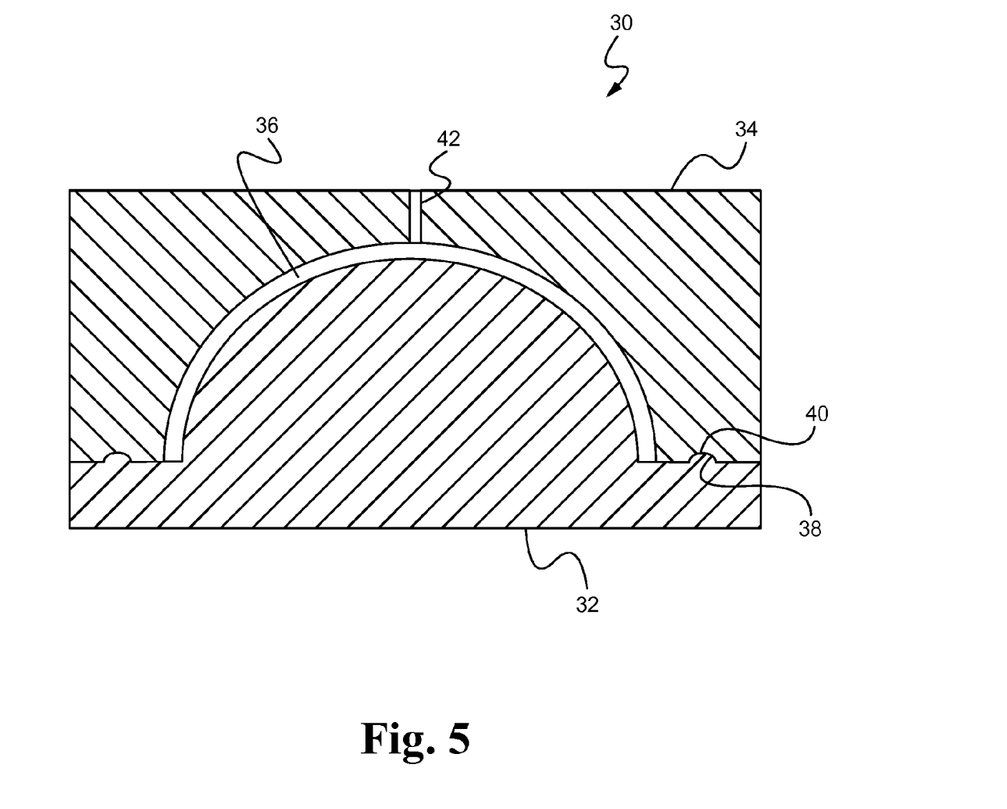
FIG. 5 is a cross-sectional view of an injection mold for injection molding a half shell of the ball of FIG. 1 during the process of FIG. 4.

FIG. 4 is a flowchart of an embodiment of a process 100 in accordance with the invention for fabricating the ball 10. The process 100 may begin at a step 102 wherein the half shells 22, 24 may be injection molded from the first thermoplastic material. FIG. 5 illustrates one example of a half shell injection mold 30 that may be used in fabricating the half shells 22, 24. The injection mold 30 may include an inner surface mold element 32 and an outer surface mold element 34 defining a cavity 36 in the shape of a half shell 22, 24. While not shown, the mold elements 32, 34 may also be shaped to form the venting hole 36 of the shell 12. The inner surface mold element 32 may include a rib 38, and the outer surface mold element 34 may include a corresponding channel 40 mating with the rib 38 to ensure that the mold elements 32, 34 are properly aligned for forming the half shell 22, 24. The outer surface mold element 34 may further include an inlet 42 placing the cavity 36 in fluid communication with the exterior of the outer surface mold element 34 such that a source of the first thermoplastic material may be connected thereto to supply the first thermoplastic material through the inlet 42 and into the cavity 36 to form the half shell 22, 24 in a conventional injection molding process. The first thermoplastic material is injected through the inlet 42, and the injection molding process occurs at the appropriate temperature and pressure for the selected first thermoplastic polymer.

Figure 6:
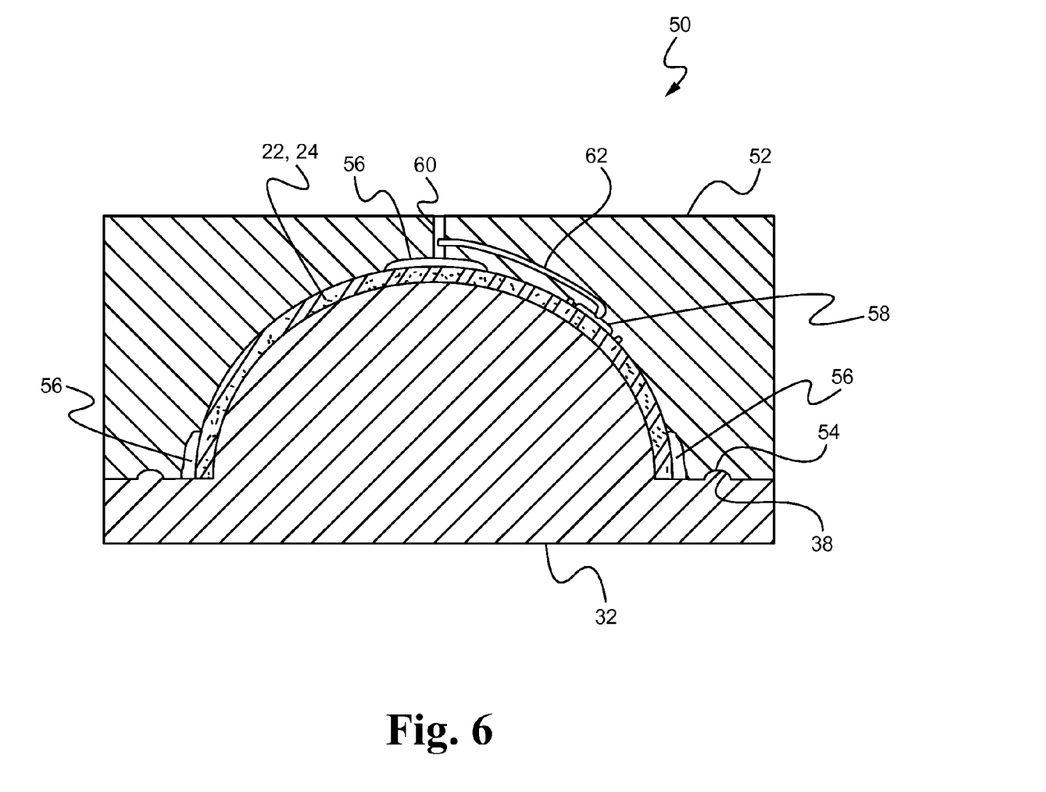
FIG. 6 is a cross-sectional view of an injection mold for injection molding details onto the outer surface of a half shell of the ball of FIG. 1 during the process of FIG. 4.

Returning to FIG. 4, after the half shell 22, 24 is injection molded at step 102, the details 14, 16 may be overmolded onto the outer surface of the half shell 22, 24 at a step 104. FIG. 6 illustrates a detail injection mold 50 in which the outer surface mold element 34 of the half shell injection mold 30 is removed and replaced with a detail outer surface mold element 52 that connects to the inner surface mold element 32 with a channel 54 mating with the rib 38 to align the mold elements 32, 52. In the illustrated embodiment, the previously-molded half shell 22, 24 may be retained on the inner surface mold element 32 when the outer surface mold element 34 is removed and the detail outer surface mold element 52 is substituted therefore. The inner surface of the detail outer surface mold element 52 may be configured generally to conform to and engage the outer surface of the half shell 22, 24, and to include portions forming cavities 56, 58 corresponding to the details 14, 16 to be overmolded onto the outer surface of the half shell 22, 24. The cavity 56 corresponds to the details 14 as seen in FIGS. 1 and 2, and the cavity 58 corresponds to the details 16 that are formed separately and detached from the details 14. As a result, the detail outer surface mold element 52 may include an inlet 60 therethrough placing the cavity 56 in fluid communication with the exterior of the mold element 52, and having a separate channel 62 extending between the inlet 60 and the cavity 58 to cause a portion of the second thermoplastic material provided by a pressurized source to the detail injection mold 50 to be diverted through the channel 62 and into the cavity 58 to form the details 16 at the desired location on the outer surface of the half shell 22, 24.

Those skilled in the art will understand that the overmolding of the detail onto the outer surface of the half shell 22, 24 may be performed at the typical temperatures and pressures necessary to perform injection molding of the selected thermoplastic material. Depending on the particular characteristics of the first and second thermoplastic materials selected for the ball 10, the details 14, 16 may be overmolded directly onto the outer surface of the half shell 22, 24, with the second thermoplastic material interacting with the first thermoplastic material to form the necessary bond for attachment of the details 14, 16 to the outer surface of the half shell 22, 24. Alternatively, if necessary, an appropriate adhesive may be applied to the outer surface of the half shell 22, 24 prior to assembly of the detail injection mold 50 such that the overmolded details 14, 16 adhere to the outer surface of the half shell 22, 24 with sufficient strength to satisfy the requirements for the particular ball 10 being fabricated.

Figure 7:
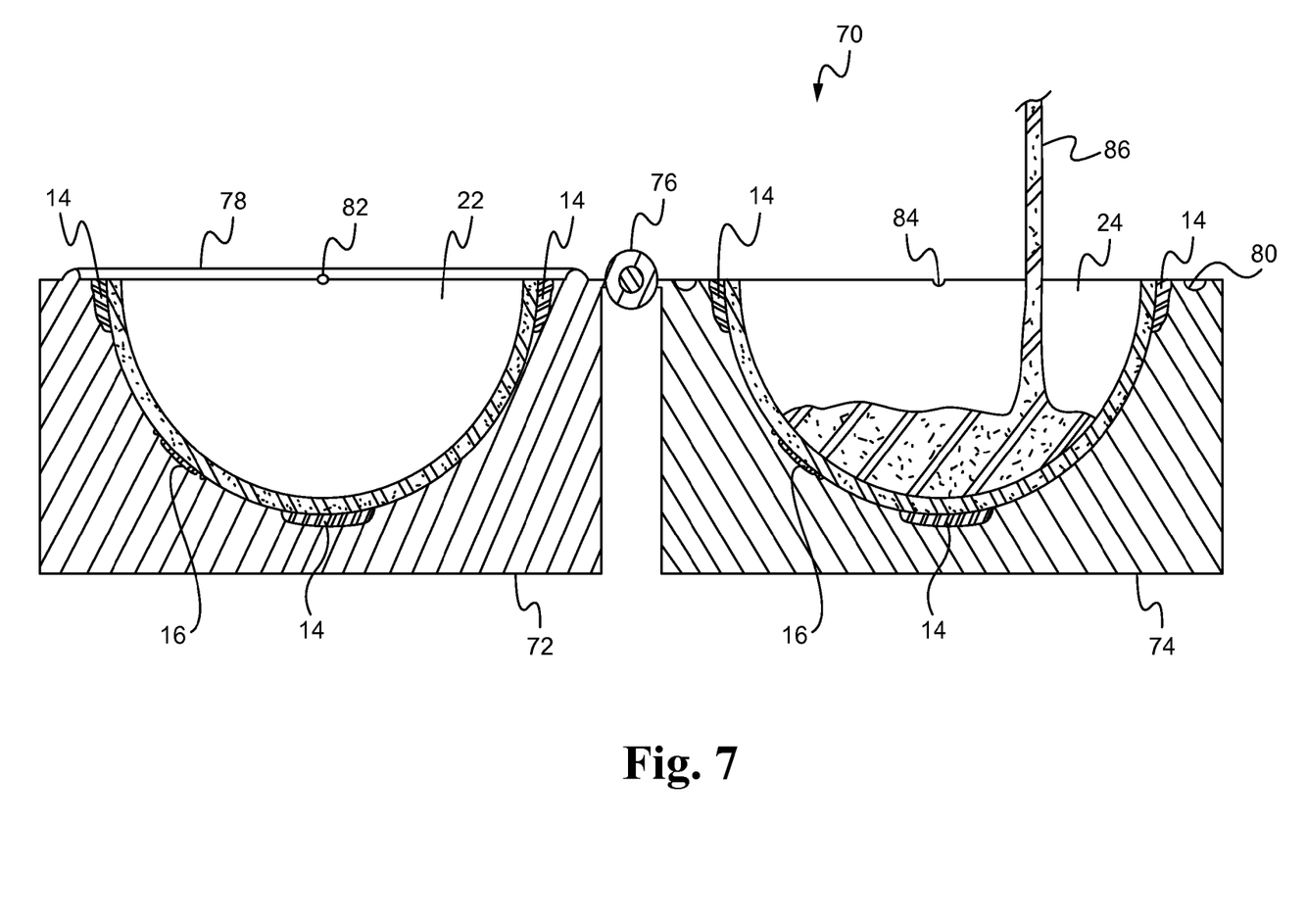
FIG. 7 is a cross-sectional view of a foam mold for molding the inner core within the shell of the ball of FIG. 1 during the process of FIG. 4 in an open position.

Once the details 14, 16 are overmolded onto the outer surface of the half shells 22, 24, the process 100 of FIG. 4 may proceed to a step 106 wherein the half shells 22, 24 may be removed from the injection mold 50 and mounted within a foam mold, such as the foam mold 70 shown in FIG. 7. The foam mold 70 may include a first foam mold element 72 receiving a half shell 22, and a second foam mold element 74 receiving a half shell 24. The inner surfaces of the mold elements 72, 74 may be shaped to correspond to the shape of the outer surfaces of the half shells 22, 24, respectively, and of the details 14, 16 overmolded thereon. Configured in this way, the mold elements 72, 74 may support the half shells 22, 24 during the foaming of the polymeric material that will form the core 18 of the ball 10. In one embodiment, the foam mold 70 may include a hinge 76 pivotally connecting the foam mold elements 72, 74 such that one of the mold elements 72, 74 may be rotated with respect to the other mold elements 72, 74 to close the mold during the foam molding process. In order to ensure proper alignment, the foam mold element 72 may include a raised rib 64 and the second foam mold element 74 may include a corresponding channel 66 that may mate with the rib 64 when the foam mold 70 is closed to properly align the inner surfaces of the mold elements 72, 74 and half shells 22, 24. In order to allow gas to escape from the interior of the ball 10 through the venting hole 26 as the foaming polymeric material expands during the foam molding process, the first foam mold element 72 may include an air passage 82 that may place the venting hole 26 and, correspondingly, the interior of the ball 10 in fluid communication with the ambient atmosphere to allow the gas to be released when the foam mold 70 is closed. If necessary, the second foam mold element 74 may have a recess 84 corresponding to the air passage 82 such that the air passage 82 is not constricted when the foam mold 70 is closed.

After mounting the half shells 22, 24 in the foam mold 70 at step 106, the process 100 of FIG. 4 may proceed to a step 108 wherein an adhesive may be applied to the rims and the inner surfaces of the half shells 22, 24 at a step 108. The adhesive may be applied to the half shells 22, 24 manually, or a spray nozzle may be used to apply adhesive supplied by a pressurized source of the adhesive. In one embodiment, the adhesive may be a general polyurethane adhesive composed of toluene (20-30%), methyl ethyl ketone (30-40%), acetone (25-30%) and polyurethane (13.5-15.5%). Those skilled in the art will understand that the need for an adhesive and the properties of the adhesive may be dictated by the requirements for the ball 10 being fabricated and the thermoplastic materials and foamed polymeric materials being used to fabricate the ball 10. For example, to achieve desired performance characteristics for the ball 10, it may not be necessary to have the core 18 adhere to the inner surface of the shell 12. Further, the properties of the thermoplastic material used to form the shell 12 and the foam polymeric material used to form the core 18 may be selected such that the materials adhere during the foaming of the foaming polymeric material. For example, the first thermoplastic material may be a PVC compound and the polymeric material may be a polyurethane compound with a vinyl add mixture such that the vinyl in the polyurethane compound may bond with the PVC compound of the shell 12 to secure the core 18 to the inner surface of the shell 12.

After the adhesive is applied to the half shells 22, 24 at step 108, if necessary, the process 100 of FIG. 4 may continue with a step 110 wherein the polymeric material may be poured into one of the half shells 24 at a step 110, and the foam mold 70 may be closed and the polymeric material may be foamed at a step 112. Returning to FIG. 7, the polymeric material 86 in a liquefied form may be poured into one of the foam mold elements, such as a second foam mold element 74 as illustrated, and the first foam mold element 72 may be rotated about hinge 76 to close the foam mold 70. Once the foam mold 70 is closed, the foam mold 70 may be rotated to a vertical position with the air passage 82 disposed at the top of the foam mold 70 so that gas may be released through the venting hole 26 and the air passage 82 as the foamed polymeric material 86 expands within the shell 12. As with the other molding steps in the process 100, the foam mold 70 may be heated to the temperature necessary to cause the particular polymeric material 86 chosen for the core 18 to foam and expand within the shell 12. Once the foamed polymeric material 86 expands to fill the shell 12 and form the core 18, the foam mold 70 may be opened and the fully fabricated ball 10 may be removed from the foam mold 70 at a step 114.

Those skilled in the art will understand that the method illustrated in FIG. 4 may be modified as necessary to fabricate ball 10 in accordance with the present invention. For example, while the process 100 includes pouring the polymeric material 86 into at least one of the half shells 22, 24 at step 110 and then closing the foam mold 70 and forming the core 18 at step 112, the process 100 may be modified such that the foam mold 70 may be closed first, and then the polymeric material 86 may be poured or injected into the cavity of the shell 12 prior to foaming the polymeric material 86. In such a modified process, it may be necessary to configure the molds 30, 50 and 70 to form a venting hole 26 and provide an air passage 82 having sufficient size, or to provide larger material inlet holes in the shell 12 and mold 70, to facilitate pouring or injecting the polymeric material 86 into the cavity after the mold 70 is closed. Depending on the size of the venting hole 26 or inlet hole through the shell 12, it may further be necessary to provide a plug fabricated from an appropriate material to close the venting hole 26 or inlet hole for cosmetic purposes after the core 18 is formed. Other modifications to the process 100 may be apparent to those skilled in the art and are contemplated by the inventors as having use with the method and the ball in accordance with the present invention.

While the preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed is:

1. A method of manufacturing a ball, comprising:
    forming a pair of half shells of an outer shell by molding a first thermoplastic material, wherein the inner surface of the half shells define corresponding portions of a cavity within the outer shell;
    forming outer details on at least a portion of the outer surface of at least one of the half shells but less than the entire outer surface of the half shell by molding a second thermoplastic material onto the outer surface of the at least one of the half shells; and
    foaming a polymeric material within the cavity of the outer shell to form a core of foamed polymeric material within the cavity of the outer shell.

2. A method as defined in claim 1, comprising:
    injection molding the first thermoplastic material to form the pair of half shells; and
    injection molding the second thermoplastic material onto the outer surface of the at least one of the half shells to form the outer details.

3. A method as defined in claim 1, wherein the first and second thermoplastic materials are polyvinyl chloride compounds.

4. A method as defined in claim 1, comprising applying an adhesive to the inner surfaces of the half shells before assembling the half shells.

5. A method as defined in claim 1, comprising applying an adhesive to rims of the half shells before assembling the half shells.

6. A method as defined in claim 1, wherein the polymeric material is a polyurethane compound.

7. A method as defined in claim 1, comprising:
    forming a half shell of the outer shell in an injection mold having a first mold element and a second mold element having surfaces that, when the first and second mold elements are in a closed position, define a molding cavity substantially corresponding to the shape of the half shell, wherein the surface of the first mold element defines the inner surface of the half shell and the surface of the second mold element defines the outer surface of the half shell;
    removing the second mold element and replacing the second mold element with a third mold element having a surface that, when the first and third mold elements are in a closed position with the half shell disposed therein and in conjunction with a corresponding portion of the outer surface of the half shell that is less than the entire outer surface of the half shell, defines a detail molding cavity substantially corresponding to the shape of an outer detail; and
    forming the outer detail by injecting the second thermoplastic material into the cavity defined by the surface of the third mold element and the corresponding portion of the outer surface of the half shell.

8. A method as defined in claim 1, comprising:
    depositing a quantity of the polymeric material into at least one of the half shells;

assembling the half shells to form the outer shell such that the inner surfaces of the half shells define the cavity of the outer shell after the quantity of the polymeric material is deposited in the at least one of the half shells.

9. A method as defined in claim 1, wherein the manufactured ball has a hardness in the range of 55 to 72 degrees on a shore 00 durometer scale as measured at the portions of the outer surface of the outer shell that are not covered by the outer details.

10. A method as defined in claim 1, wherein the manufactured ball has a hardness in the range of 67 to 82 degrees on a shore 00 durometer scale as measured at the outer details.

11. A method as defined in claim 1, wherein the first thermoplastic material forming the outer shell is a PVC compound having a hardness of approximately 50 degrees on a shore A durometer scale.

12. A method as defined in claim 1, wherein the second thermoplastic material forming the outer details is a PVC compound having a hardness of approximately 20 degrees on a shore A durometer scale.

13. A method as defined in claim 1, wherein the polymeric material forming the core is a high resilience polyurethane foam composed of approximately 53% polyal, approximately 37% isocyanate, approximately 7% blowing agent and approximately 3% other additives and fungi preventol.

14. A method as defined in claim 4, wherein the adhesive applied to the inner surface of the half shells is a general polyurethane adhesive composed of toluene in the range of 20-30%, methyl ethyl ketone in the range of 30%-40%, acetone in the range of 25%-30% and polyurethane in the range of 13.5%-15.5%.

* * * * *